May 6, 1924.                                                                 1,493,003
A. C. RECKER ET AL
DUPLEX PUSH TYPE FLUSH RECEPTACLE FOR ELECTRIC INSTALLATION
Filed Nov. 5, 1920                    2 Sheets-Sheet 1
Fig. 1.
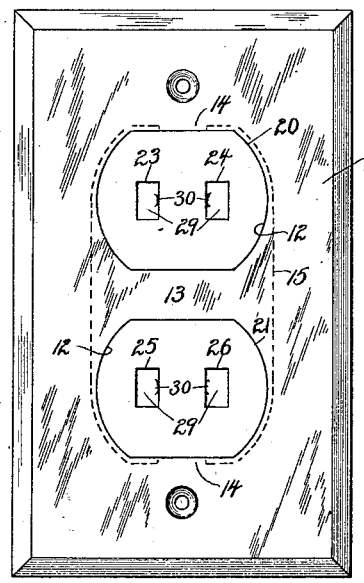
Fig. 2.
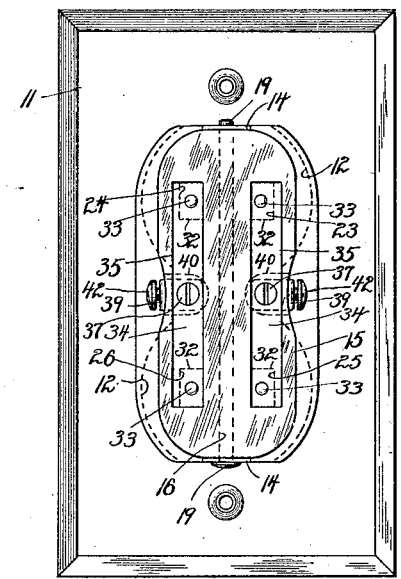
Fig. 3.
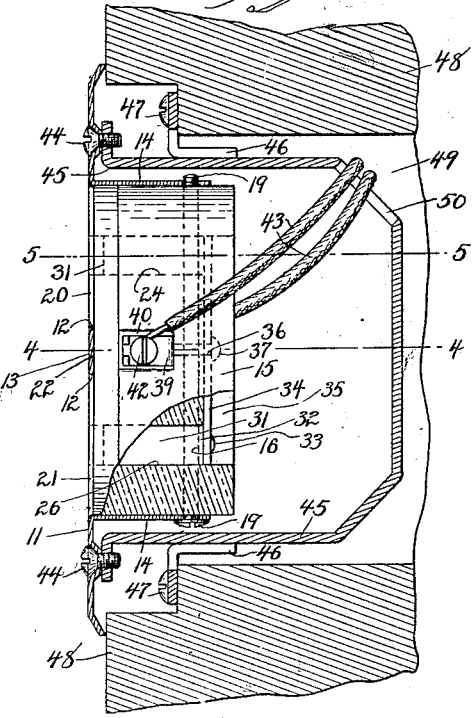
Fig. 4.
Inventors
Adolph C. Recker
Herbert E. Cady
by Seymour & Earle
attys May 6, 1924.
A. C. RECKER ET AL
1,493,003
DUPLEX PUSH TYPE FLUSH RECEPTACLE FOR ELECTRIC INSTALLATION
Filed Nov. 5, 1920    2 Sheets-Sheet 2
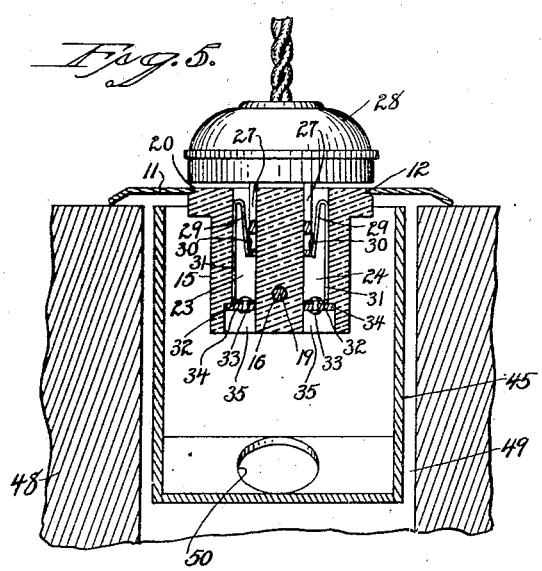
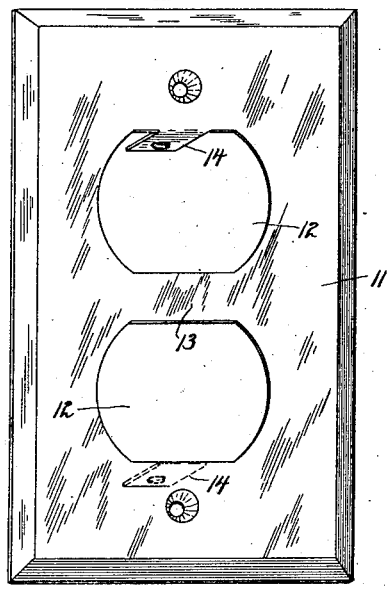
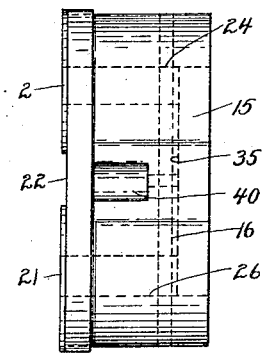
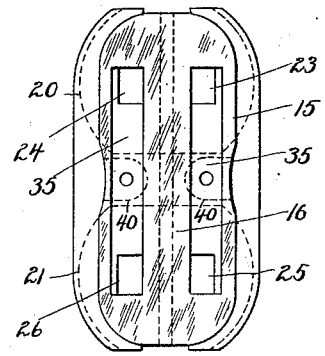
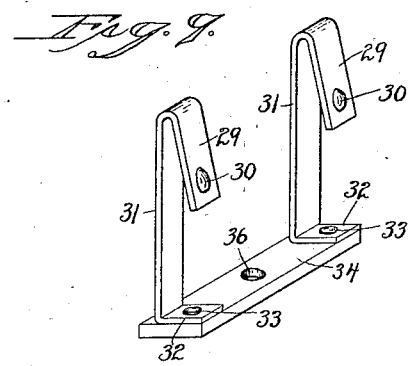
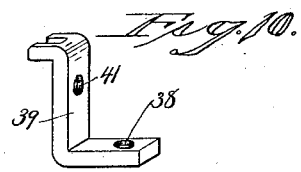

Patented May 6, 1924.

1,493,003

UNITED STATES PATENT OFFICE.

ADOLPH C. RECKER, OF OAKVILLE, AND HERBERT C. CADY, OF WATERBURY, CONNECTICUT, ASSIGNORS TO THE CHASE COMPANIES, INC., OF WATERBURY, CONNECTICUT, A CORPORATION.

DUPLEX PUSH-TYPE FLUSH RECEPTACLE FOR ELECTRIC INSTALLATION.

Application filed November 5, 1920. Serial No. 421,919.

*To all whom it may concern:*

Be it known that we, ADOLPH C. RECKER and HERBERT C. CADY, citizens of the United States, residing at Oakville and Waterbury, respectively, in the counties of Litchfield and New Haven, respectively, and State of Connecticut, have invented a new and useful Improvement in Duplex Push-Type Flush Receptacles for Electric Installation; and we do hereby declare the following, when taken in connection with the accompanying drawings and the characters of reference marked thereon, to be a full, clear, and exact description of the same, and which said drawings constitute part of this application, and represent, in—

Fig. 1 a view in front elevation of a duplex push-type flush receptacle embodying our invention.

Fig. 2 a view thereof in rear elevation.

Fig. 3 a view thereof in central longitudinal section as installed, the insulating-block being shown in side elevation with a portion of its lower end in section.

Fig. 4 a view thereof in transverse section on the line 4—4 of Fig. 3.

Fig. 5 a view thereof in transverse section on the line 5—5 of Fig. 3, showing a push plug as inserted into the receptacle.

Fig. 6 a detached perspective view of the receptacle-plate.

Fig. 7 a detached view in side elevation of the double insulating-block.

Fig. 8 a view thereof in rear elevation.

Fig. 9 a detached perspective view of one of the two distributing-plates shown as mounting its pair of spring-contacts.

Fig. 10 a detached perspective view of one of the terminal-plates.

Our invention relates to an improved push-type flush receptacle for electric installation, the object being to produce a compact, duplex or double fixture of superior simplicity, fewness of parts, and convenience of installation and attention, the fixture being constructed with particular reference to permit the employment of one or two push-plugs at the same time.

With these ends in view, our invention consists in a push-type flush receptacle characterized by having a double insulating-block carried by the receptacle-plate.

Our invention further consists in certain details of construction as will be hereinafter described and pointed out in the claims.

In carrying out our invention as herein shown, we employ an oblong rectangular receptacle-plate 11 formed with two corresponding openings 12 located in line with the major axis of the plate and separated from each other by a bridge 13 forming a part thereof. Parallel, perforated mounting-arms 14, bent inwardly at right angles to the plane of the plate from the outer walls of the said openings, receive between them an oblong double insulating-block 15 of porcelain or other corresponding material arranged in line with the major axis of the plate, the said block being longitudinally traversed by a hole 16 receiving a long screw 19 passing at its respective ends through the perforations of the mounting-arms 14, whereby the block is fastened to and carried by the receptacle-plate instead of being suspended within the loom-box which is the common practice.

Upon its forward face, the block 15 is formed with two narrow shoulders 20, 21, corresponding in contour to the openings 12 and substantially corresponding in depth to the thickness of the plate, it being designed that the faces of the shoulders shall be about flush with the face of the plate. As shown in Fig. 7, these shoulders are separated by a space 22 corresponding in width to the bridge 13 of the plate. The said block 15 is formed with a pair of parallel rectangular service-openings 23 and 24, extending inward from the forward face of its shoulder 20 and with a corresponding pair of service-openings 25 and 26 extending inward from the forward face of its shoulder 21, as shown in Fig. 1. The said pairs of openings respectively receive the contact-fingers 27 of standard push-plugs, such as the push-plug 28 shown in Fig. 3, it being understood that to take full advantage of our improved duplex receptacle two push plugs are employed, though it will operate equally well with a single push plug. The several openings 23, 24, 25 and 26 contain spring-contacts, each like the other and each comprising a spring-arm 29 having a retaining nub or projection 30, a reach 31, and a perforated fastening-arm 32 by means of which latter the spring-contacts are secured by rivets 33 to two like distributing-plates 34 located in longitudinal recesses 35 formed in the rear face of the block. Under this arrangement, the spring-contacts in the openings 23 and 25 are connected together while the spring contacts in the openings 24 and 26 are connected together, this being necessary to provide for tapping off current by the use of one or two push plugs, as the case may be. The respective plates 34 are formed with screw holes 36 receiving screws 37 entering threaded holes 38 in angular terminal-plates 39 located in lateral recesses 40 in the sides of the block 15, the said angular plates being also formed with threaded holes 41 for the reception of binding screws 42 for the attachment of the service wires 43, which are thus connected with the respective sides of the block rather than with its rear face as is commonly done.

As shown, the receptacle-plate 11 is fastened by screws 44 to the flange of a loom-box 45 provided at its ends with brackets 46 fastened by screws 47 to a wall 48 containing a recess 49 provided for the reception of the loom-box which is formed with a port 50 for the passage of the wires 43. We do not, however, limit ourselves to the use of our improved duplex flush receptacle in loom-boxes of any one description.

It is apparent that as current is supplied to all of the spring-contacts by the distributing-plates 34, it may be tapped off by the use of a plug applied to the openings 23 and 24 or to the openings 25 and 26, or by two plugs applied to the respective openings at the same time.

We claim:

1. A duplex push-type flush receptacle for electric installation, having a receptacle-plate formed with two openings and with mounting-arms extending rearwardly at right angles to the plane of the plate, an insulating block inserted between and secured to the said mounting-arms and formed with two pairs of service-openings entering its front face which is substantially flush with the face of the plate, spring-contacts located in the said openings, distributing-plates located in recesses in the rear face of the block and terminal plates located in recesses formed in the sides of the block connected with the said distributing-plates, the whole forming a unitary structure adapted as such to be secured to an outlet box.

2. A duplex push-type flush receptacle for electric installation, having a receptacle-plate formed with two openings separated from each other by a portion of the plate, mounting-arms connected with the plate and extending rearwardly therefrom at right angles thereto, an insulating-block secured to the said arms and having shoulders entering the openings in the plate, the face of which is substantially flush with the front face of the block, two pairs of service-openings entering the block through the said shoulders thereof, contact-springs located in the said openings, two terminal-plates mounted in the said block, and connections between the contact springs and terminal plates, whereby corresponding springs of the respective pairs are coupled together, the whole forming a unitary structure adapted as such to be secured to an outlet box.

In testimony whereof, we have signed this specification in the presence of two subscribing witnesses.

ADOLPH C. RECKER.
HERBERT C. CADY.

Witnesses:
JOHN W. HARD,
JOHN S. NEAGLE.